April 8, 1930.   O. A. PAWLICK ET AL   1,754,039
APPARATUS FOR MEASURING AND INDICATING EFFICIENCIES
Filed May 22, 1928
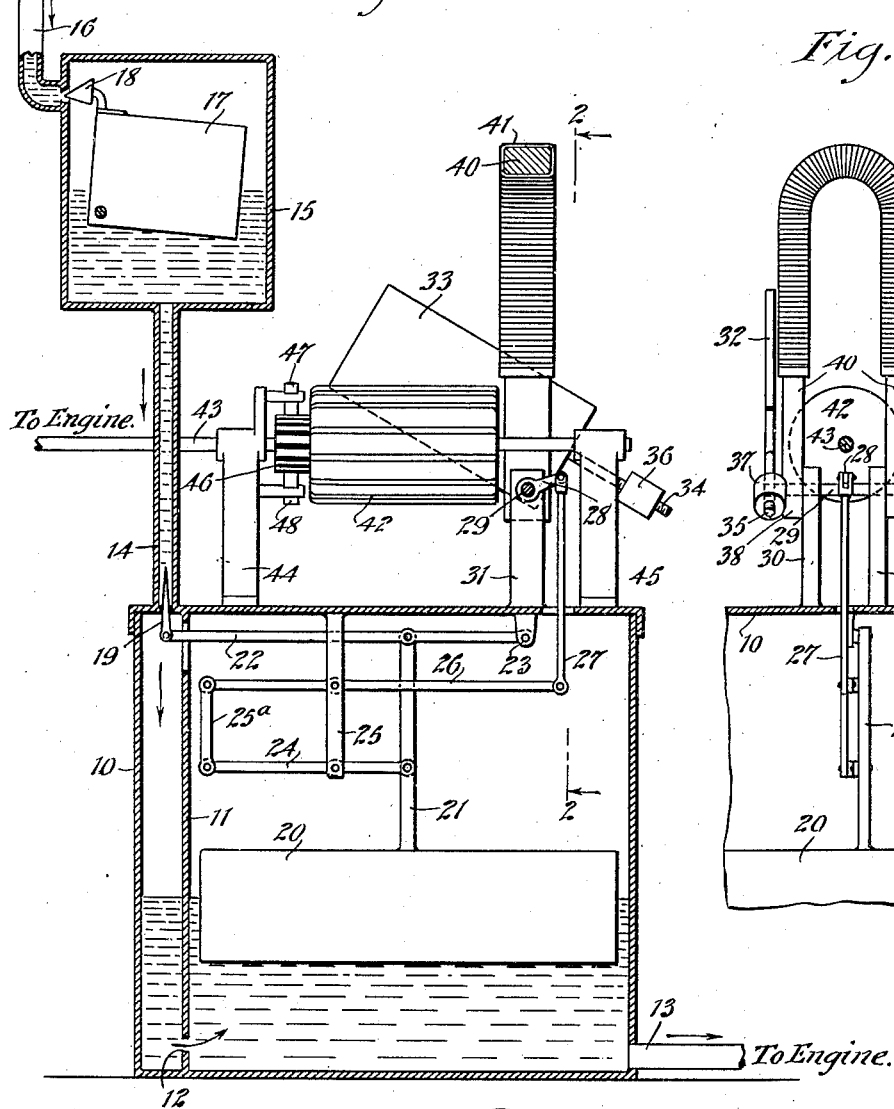
WITNESSES
Edw. Thorpe
INVENTORS
O. A. Pawlick
R. C. Giese
BY Munn & Co
ATTORNEY Patented Apr. 8, 1930

1,754,039

UNITED STATES PATENT OFFICE

OTTO A. PAWLICK, OF WEST ORANGE, AND RAYMOND C. GIESE, OF EAST ORANGE, NEW JERSEY

APPARATUS FOR MEASURING AND INDICATING EFFICIENCIES

Application filed May 22, 1928. Serial No. 279,807.

The invention relates to an apparatus whereby the efficiency of an operating motor can be directly read on an instrument. It relates particularly to a simple apparatus whereby an electrical or a gasolene motor is connected by suitable mechanism with an indicator which will indicate the efficiency direct; that of the gasolene motor, for instance, being indicated in miles or revolutions per gallon.

The practical object of the invention is to provide a means whereby the operator of an aeroplane or an automobile, or the operator of any engine whether electrical or internal combustion, may know the speed at which his machine has the highest efficiency, whereby he may become aware of the best adjustments for the various elements to produce this efficiency, and may know the kind of fuel best suited to the machine. Furthermore, the above object when achieved, will permit a ready indication of any change in the efficiency of the engine, so that it can be overhauled or examined to ascertain the trouble.

To this end, the invention comprises a generator of electricity connected to a prime mover, which may be an electrical motor or a gasolene motor, the output of the generator being in a predetermined manner proportional to the speed of the prime mover. Simple and efficient means connected to and controlled by the consumption of electrical or fluid fuel by the prime mover are associated with the electrical generator in order to vary its output as the consumption of fuel varies.

More particularly, the invention comprises a series generator hooked up with a gasolene engine. The generator is provided with movable field poles connected by suitable linkage to a float mechanism, the position of which is determined by the rate of consumption of gasolene by the engine, a valve arrangement is also connected to the float, so that the inlet of fuel to the float chamber is also calibrated, and in some predetermined proportion to the variation in the flux characteristics of the generator.

A preferred form of the invention is illustrated in the drawings, of which—

Fig. 1 is a vertical section through the device.

Fig. 2 is a transverse section taken on the line 2—2 of Fig. 1.

Fig. 3 is a diagrammatic view of the circuit connection between the series motor and the indicator.

As shown in the drawings, the preferred form comprises a tank 10 having a partition 11 with an aperture 12 near the bottom thereof. This tank has an outlet pipe 13 leading to a gasolene engine, and an inlet pipe 14 at the top thereof. This inlet pipe is connected to an auxiliary tank 15 having in turn an inlet 16 connected to any suitable supply of fuel such as gasolene. Within the tank 15 is a pivoted float 17 having a valve 18 to maintain the level of liquid within the tank 15 at an approximately constant level, so that a liquid head between the tank 15 and the needle valve 19 at the bottom of pipe 14 can be maintained. This is provided so as to maintain a constant flow depending only on the position of the needle valve.

Within the tank 10 is a float 20 which is rigidly connected to a rod 21. This rod is pivoted to a lever 22 connected at one end to the needle valve 19 and to bracket 23 at the other end; this bracket being fastened to the top of tank 10. The float rod 21 is also pivotally connected to a lever 24 which is pivoted to a fixed bar 25 at an intermediate point. The other end of this lever 24 is pivotally connected by a link 25ª to a lever 26 pivotally mounted at an intermediate point to the bar 25. The other end of lever 26 is connected to a vertical rod 27 extending through an opening in the top of tank 10 connecting to an arm 28.

This arm 28 is fastened to a shaft 29 which extends across between pedestal members 30 and 31 mounted on top of the tank 10. On the ends of the shaft 29 are mounted metallic plates 32 and 33 of magnetic material. These plates are provided with rearwardly extending threaded stems 34 and 35, on which, balance weights 36 and 37 are adjustably mounted, so that these weights can be adjusted to balance the weight of the plates on the opposite side of the pivot points.

These plates are disposed laterally with respect to the lower ends 38 and 39 of a U-shaped electromagnet 40 which is also connected to and mounted on the pedestal elements 30 and 31. This magnet is provided with a coil 41.

Flux is created in the magnet and the adjustable plates 32 and 33 by current passing through the coil 41 in series with the armature 42 of a series generator. This armature is mounted on a shaft 43 journaled in pedestals 44 and 45 mounted on the top of the tank 10. The generator is provided with the usual commutator 46 and brushes 47 and 48 which are connected to an indicating device such as 49 shown in Fig. 3. The scale of the indicating device is calibrated preferably in miles per gallon, although it may be calibrated in revolutions per gallon, giving an indication of the relation between the speed of the engine and consumption of fuel.

Considering the above detailed description, it is apparent that with the generator connected to the engine or prime mover, the output of the generator, since it is a series generator will be proportional to the square of the speed of the prime mover. Another element which determines the output of the generator is the magnetic pole or field flux which cuts the armature. The higher the speed of the armature for a given field flux, the greater the output. Consequently, since the armature is connected to the engine, an increase in the speed of the engine will tend to increase the output of the generator.

On the other hand, the increased speed of the engine will require more fuel, and by means of the described floats and valves and levers, the rate of flow of the fuel is made to cause a change in the magnitude of the field flux passing through the armature. Therefore, after the machine has been properly calibrated and the parts adjusted with respect to the definite factors in the particular combination of elements involved, as the demand for fuel becomes greater, the magnetic flux passing through the armature becomes less. Thus, if the engine is actually of the same efficiency at different speeds, the magnetic flux cut by the armature will remain constant, because, although the speed of cutting of lines of force increases or decreases, the number of lines will automatically be decreased or increased.

Therefore, turning to the drawings, it will be apparent that, for the position of the parts shown in Fig. 1, and with a given speed of the engine, the indicator 49 will read a definite number of miles per gallon. Assuming a given efficiency for the engine, if the speed is increased, this will speed up the generator to tend to increase its output. If the other factors did not change, the indicator 49 would register a higher value, but by properly calibrating the parts, an increased speed of the engine will cause more fuel to flow out through pipe 13, and consequently lowering the level of fuel in tank 10 and causing the float 20 to drop a slight amount. This change in the level of the float 20 will open the needle valve 19 slightly, allowing more fuel to flow in through pipe 14, and at the same time will cause an elevation of the movable pole pieces 32 and 33. This elevation by reason of the calibrated design of the plates will cause just sufficient a reduction of the magnetic flux to maintain the output of the generator at the constant value. Therefore, assuming the same efficiency for the engine, the reading will be the same at various speeds. If something happens to the engine, and it takes more gasolene to drive it at a certain speed, then of course, the increased consumption of gasolene will not be exactly balanced by the change in speed of the generator, and consequently the output of the generator will vary disproportionately and the indicator needle will show a drop in efficiency.

We claim:

1. An apparatus comprising a generator connected to a prime mover, an output circuit for the generator, an electrical measuring instrument in said circuit, the output of the generator being proportional to the speed of the prime mover, and means controlled by the consumption of fuel of the prime mover to vary the output of the generator.

2. An apparatus comprising an electrical generator connected to and driven by a gasolene engine, an output circuit including a measuring instrument associated with said generator, the output of the generator being proportional to the speed of the gasolene engine, and means controlled by the consumption of fuel of the gasolene engine to vary the output of the generator.

3. An apparatus comprising an electrical generator connected to and driven by a gasolene engine, an output circuit including a measuring instrument associated with said generator, the output of the generator being proportional to the speed of the gasolene engine, a gasolene chamber connected to the engine, a float therein, and means operated by the float to vary the output of the generator as the flow of gasolene from said chamber varies.

4. An apparatus comprising an electrical generator connected to and driven by a gasolene engine, an output circuit including a measuring instrument associated with said generator, the output of the generator being proportional to the speed of the gasolene engine, a gasolene chamber connected to the engine, a float in said chamber, means actuated by the float to control the flow of gasolene into said chamber, and means actuated by the float to vary the output of the generator as the flow of gasolene from said chamber varies.

5. An apparatus comprising an electrical generator connected to and driven by a gasolene engine, an output circuit including a measuring instrument associated with said generator, the output of the generator being proportional to the speed of the engine, a gasolene chamber connected to the engine, a float in said chamber, a valve actuated by the float to control the flow of fuel into said chamber, movable field poles on said generator, and means connecting said float with said field poles to move them and vary the field flux of the generator as the gasolene consumption of the engine varies.

6. An apparatus comprising a gasolene chamber, an engine connected to the chamber, a float in said chamber, a valve actuated by said float to control the entry of gasolene into said chamber, an auxiliary chamber above the first chamber and connected thereto, a float valve in said auxiliary chamber to control the fluid level therein and maintain constant the fluid head on the valve in the first chamber, an electrical generator connected to an engine, an output circuit for said generator including a measuring instrument, the output of the generator being proportional to the speed of the engine, means for varying the field flux cut by the armature of said generator, said means being connected to and operated by the float in the first chamber.

7. An apparatus comprising a series generator, a gasolene engine connected thereto, movable field poles to vary the field flux through the armature of the generator, a gasolene chamber connected to the engine, and a float in said chamber connected to said field poles.

8. An apparatus comprising a series generator, a gasolene engine connected thereto, movable field poles to vary the field flux through the armature of the generator, a gasolene chamber connected to the engine, and a float in said chamber connected to said field poles, and a needle valve connected to the float to control the inlet of fuel to said chamber.

9. The combination with an electrical generator having an output circuit and a measuring instrument therefor, of means for moving said generator in response to movements of an engine, and means for varying the output of said generator in response to fuel consumption by said engine.

10. The combination with an electrical generator having an output circuit and a measuring instrument therefor, of means for moving said generator in response to movements of an engine, and means for varying the output of said generator in response to fuel consumption by said engine, said second-mentioned means including movable pole pieces associated with said generator.

11. The combination with an electrical generator having an output circuit and a measuring instrument therefor, of means for moving said generator in response to movements of an engine, means for varying the output of said generator in response to fuel consumption of said engine, said second-mentioned means including movable pole pieces associated with said generator, and float-controlled means for moving said pole pieces.

12. The combination with an electrical generator having movable pole pieces, of means for moving said pole pieces in response to the consumption of fuel by an internal combustion engine.

OTTO A. PAWLICK.
RAYMOND C. GIESE.